H. KRAWCZYSZYN.
HORSESHOE.
APPLICATION FILED JAN. 23, 1919.

1,302,675.

Patented May 6, 1919.
2 SHEETS—SHEET 1.

Inventor
H. Krawczyszyn

By N. M. Wilson
Attorney

H. KRAWCZYSZYN.
HORSESHOE.
APPLICATION FILED JAN. 23, 1919.
1,302,675.
Patented May 6, 1919.
2 SHEETS—SHEET 2.
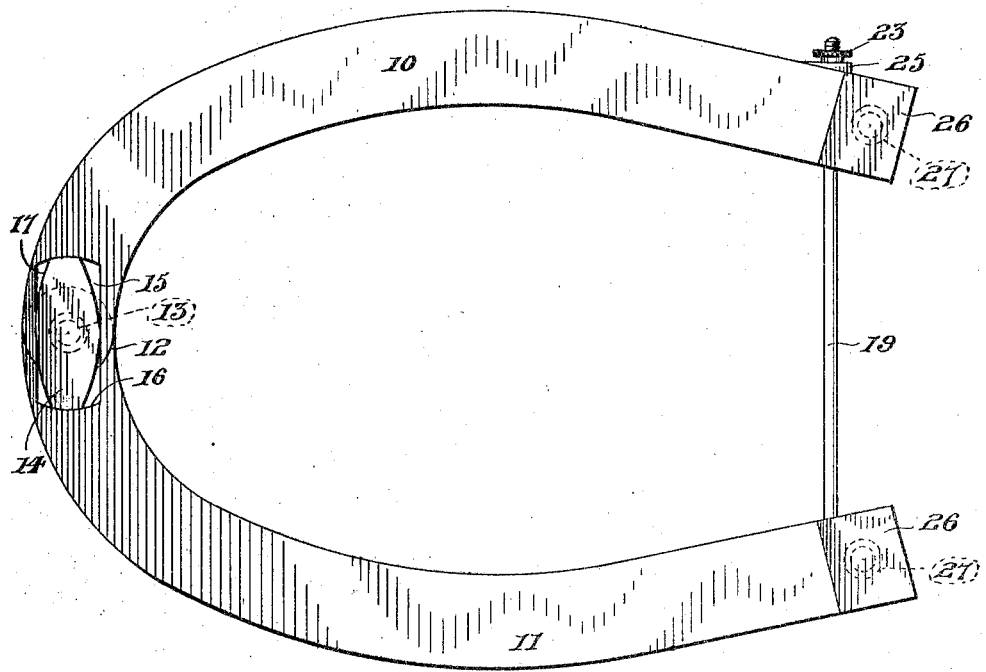
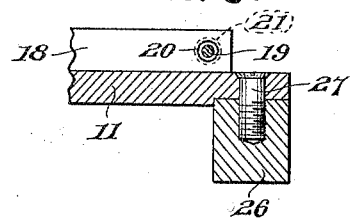
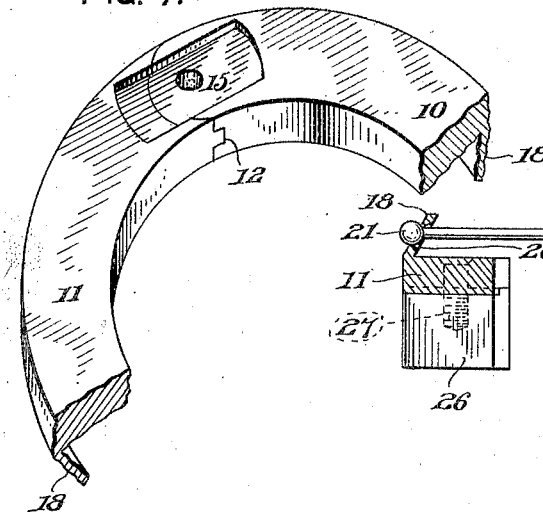
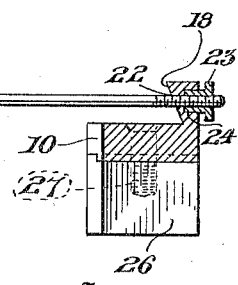
Inventor
H. Krawczyszyn
By N. M. Wilson
Attorney

UNITED STATES PATENT OFFICE.

HAWRYIL KRAWCZYSZYN, OF PITTSBURGH, PENNSYLVANIA.

HORSESHOE.

1,302,675. Specification of Letters Patent. Patented May 6, 1919.

Application filed January 23, 1919. Serial No. 272,674.

*To all whom it may concern:*

Be it known that I, HAWRYIL KRAWCZYSZYN, a citizen of Ukraine, residing at Pittsburgh, in the county of Allegheny and State of Pennsylvania, have invented certain new and useful Improvements in Horseshoes, of which the following is a specification.

The primary object of the invention is the provision of a horseshoe that possesses great strength and is easily attached to the hoof of an animal such as a horse, the shoe being removable when desired to renew the calk members of the shoe.

A further object of the invention is to provide a horseshoe adapted for attachment to a horse's hoof without the employment of the usual horseshoe nails and consisting of a device which is complete in itself ready for positioning for use upon the hoof.

With these general objects in view, the invention consists of the novel combination and arrangement of parts hereinafter fully described in connection with the accompanying drawings and in which like reference characters designate corresponding parts throughout the several views.

In the drawings,

Fig. 4 is a bottom plan view of the same;

Figs. 5 and 6 are sectional views taken upon lines V—V and VI—VI, respectively, of Fig. 1; and Fig. 7 is an inverted perspective view of the toe portion of the shoe with the hinge screw and toe calk removed.

Figure 1:
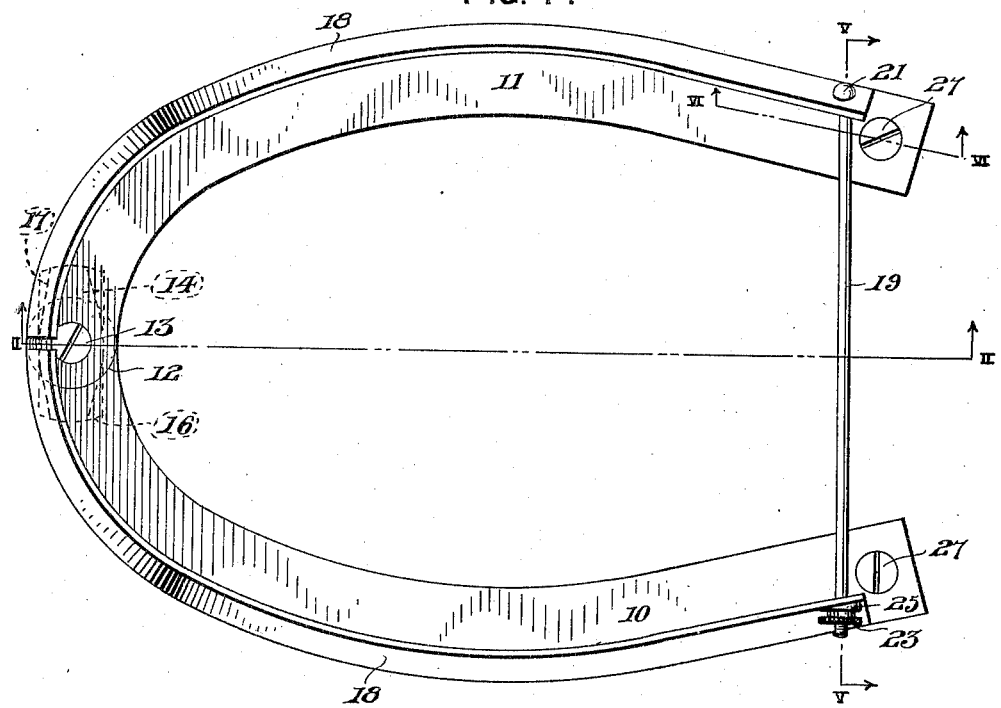
Figure 1 is a top plan view of the invention.
Figure 2:
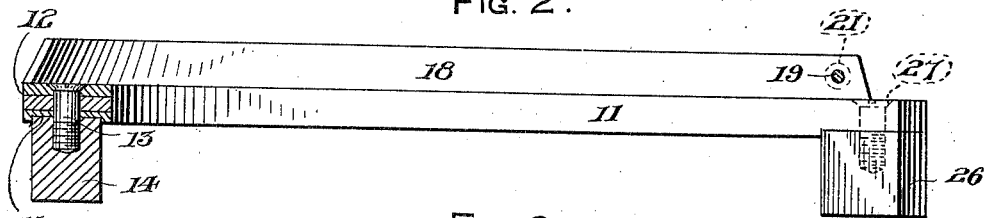
Fig. 2 is a sectional view taken upon line II—II of Fig. 1.
Figure 3:
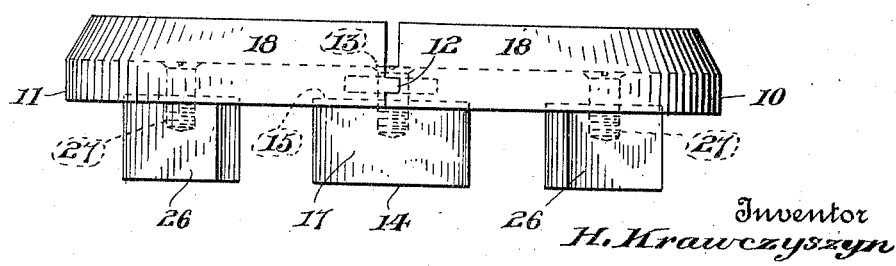
Fig. 3 is a front elevation of the device.

Referring more in detail to the drawings, my shoe is constructed of opposite arcuate sections 10 and 11 positioned together in the form of an arch or horseshoe by the employment of a hinge joint 12 at the forward meeting ends of the sections. A pivot screw or bolt 13 is provided for the hinge joint 12 employing a toe calk 14 upon the bottom of the shoe in the place of a nut, the bolt 13 being threaded into the said calk 14.

The nut or calk 14 is seated in a recess 15 in the lower face of the shoe sections 10 and 11 at their point of hinge connections, the opposite end walls 16 of the recess being arcuate and the opposite sides 17 of the calk 14 also being arcuate and permitting a slight swinging movement of the shoe sections 10 and 11 upon the pivot bolt 13. An upwardly projecting inturned flange 18 is provided upon the outer margin of each of the sections 10 and 11, it being understood that the shoe is positioned with the upper face of the sections 10 and 11 flatly engaging the bottom of the hoof while the flanges 18 bear against the outer sides of the hoof.

A clamping rod 19 extends through a perforation 20 in the flange 18 of the shoe section 11 and is provided with a spherical head 21 bearing upon the outer face of the flange. The rod 19 also extends through a perforation 22 in the oppositely positioned flange 18 of the section 10 and has a nut 23 threaded upon the end of the rod outwardly of the perforation 22 and bearing in a socket 24 in the flange surrounding the perforation 22.

The manner of placing the shoe upon the bottom of the hoof having been described, it will be seen that upon tightening the nut 23 and drawing the rear portions of the sections 10 and 11 toward each other, the said shoe sections are firmly secured upon the hoof of the animal for use in traveling. A shoulder 25 is also preferably provided upon the flange 18 of the section 10 for forming the socket 24 in said flange and shoulder, the shoulder imparting strength to the holding end portion of said flange. The calks 26 are secured beneath the free end portions of the shoe sections 10 and 11 by means of the screws 27. The calks 26 are substantially beneath the rod 19 and it will be understood that the head 21 of the latter permits the rod to slightly change its position during the tightening and releasing operation of the shoe upon the hoof.

The shoe is readily removed from the hoof by releasing the nut 23 and spreading the sections 10 and 11 apart, disengaging the flanges 18 from the sides of the hoof. The shoe possesses great strength and serviceability and is easy and inexpensive to manufacture.

What I claim as new is:—

1. A horseshoe comprising arcuate sections having shiftable connecting portions at their adjacent forward ends and with a recess in the under face of the sections at said ends thereof, a toe calk seated within said recess and projecting beneath the shoe having curved sides adapted for accommodating the relative swinging movements of said sections, an upwardly and inwardly projecting flange carried by the outer margins of each shoe section, a clamping rod extending through the rear portion of one of said flanges having a spherical head upon the rod outwardly of the flange, a shoulder upon the opposite flange with the shoulder and its carrying flange provided with a socket and a perforation, the other end of said rod being screw-threaded and projecting through said socket and shoulder and the adjacent perforation, and an adjusting nut threaded upon the free end of the rod and journaled in said socket.

2. A horseshoe comprising arcuate sections having shiftable connecting portions at their adjacent forward ends and with a recess in the under face of the sections at said ends thereof, a toe calk seated within said recess and projecting beneath the shoe having curved sides adapted for accommodating the relative swinging movements of said sections, an upwardly and inwardly projecting flange carried by the outer margins of each shoe section, a clamping rod extending through the rear portion of one of said flanges having a spherical head upon the rod outwardly of the flange, a shoulder upon the opposite flange with the shoulder and its carrying flange provided with a socket and a perforation, the other end of said rod being screw-threaded and projecting through said socket and shoulder and the adjacent perforation, an adjusting nut threaded upon the free end of the rod and journaled in said socket whereby the shoe is adapted for detachable engagement with the hoof of an animal upon the swinging of said shoe sections toward each other upon turning said socketed nut in one direction, and heel calk secured to the lower face of said sections adjacent the free ends thereof and substantially beneath the said rod.

In testimony whereof I affix my signature.

HAWRYIL KRAWCZYSZYN.

Copies of this patent may be obtained for five cents each, by addressing the "Commissioner of Patents, Washington, D. C."